UNITED STATES PATENT OFFICE.

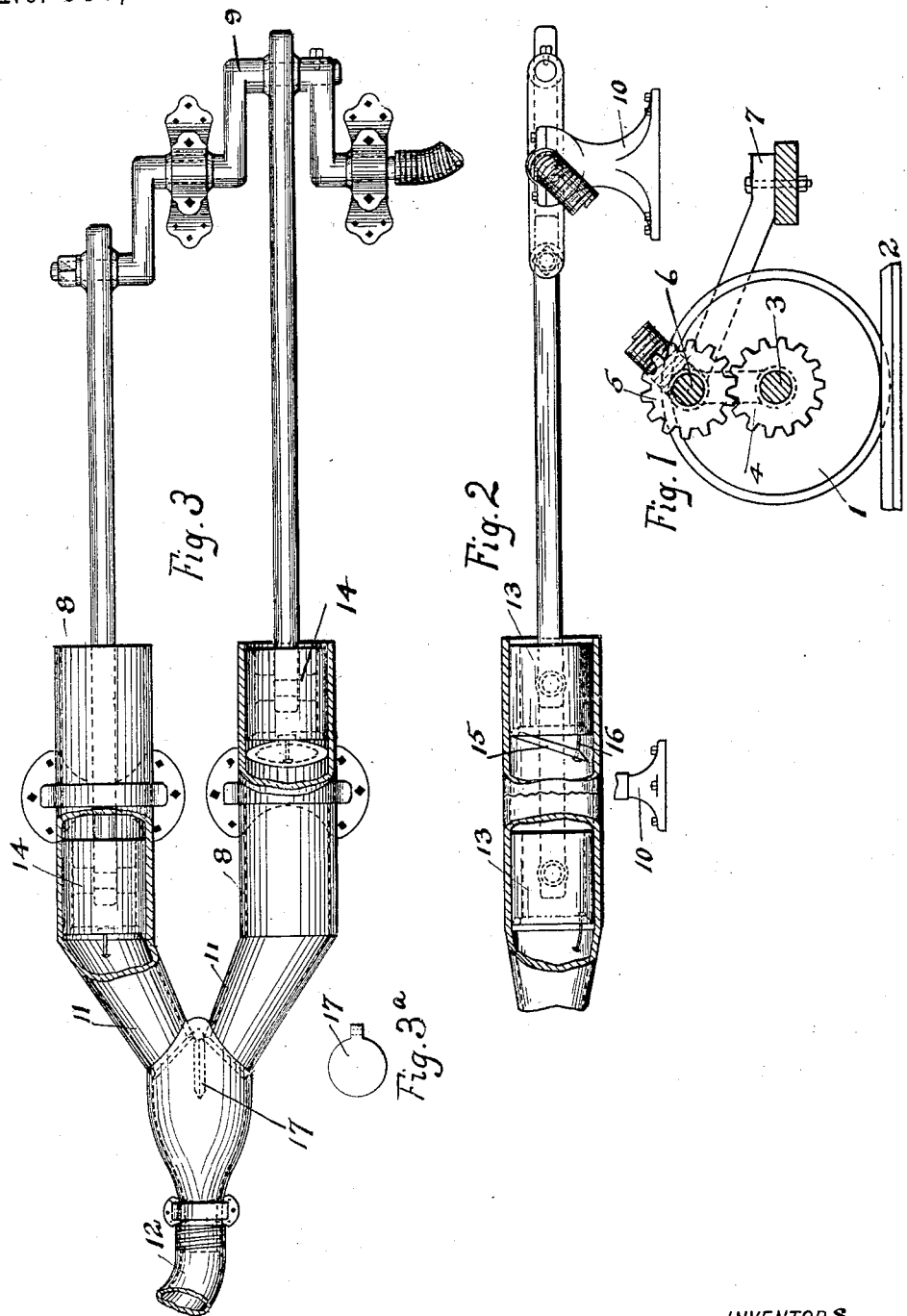

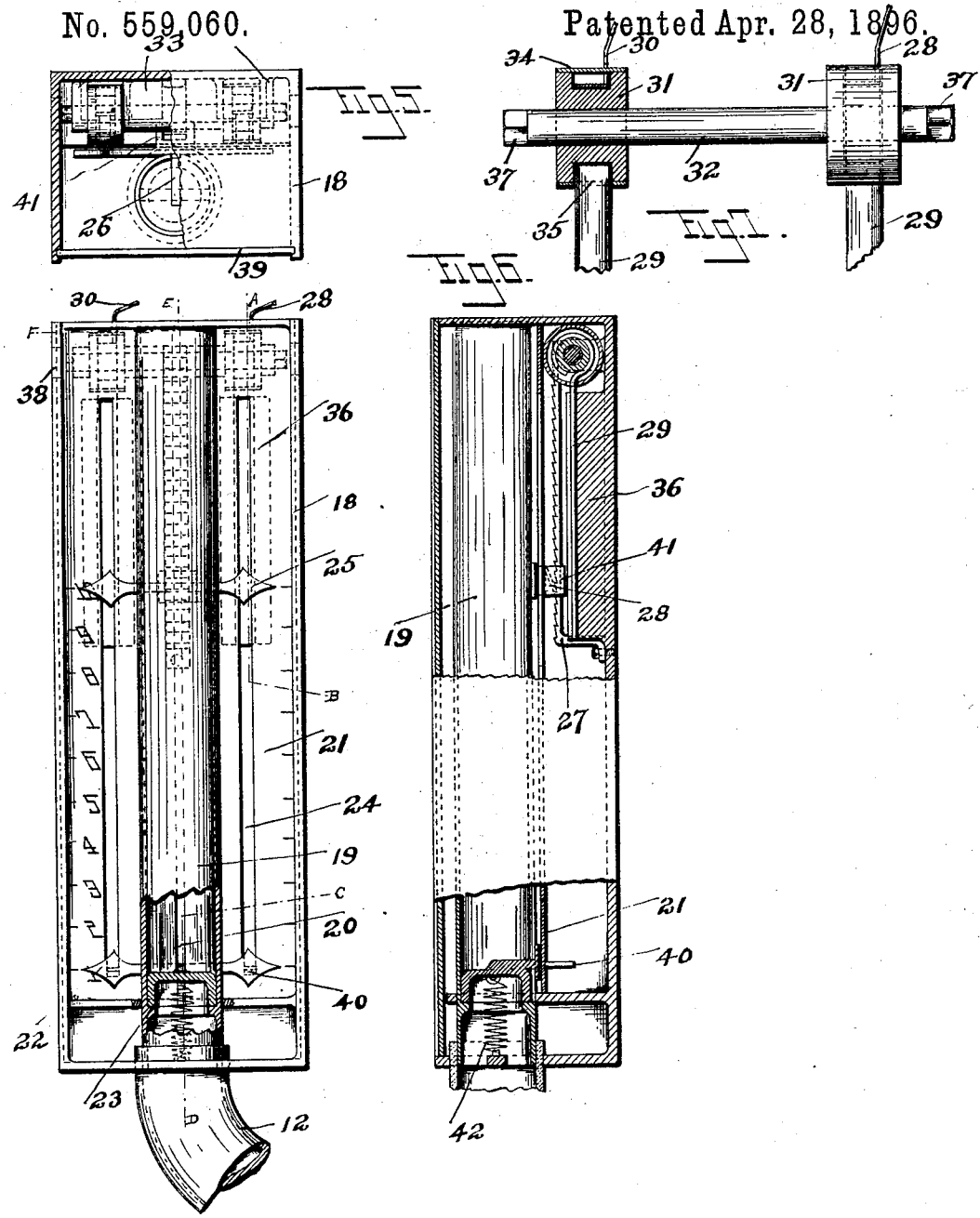

JAMES M. KANE AND JAMES H. MacLAUCHLAN, OF NEW HAVEN, CONNECTICUT.

SPEED-INDICATOR FOR VEHICLES.

SPECIFICATION forming part of Letters Patent No. 559,060, dated April 28, 1896.

Application filed April 23, 1895. Serial No. 546,879. (No model.)

*To all whom it may concern:*

Be it known that we, JAMES M. KANE and JAMES H. MacLAUCHLAN, of the town and county of New Haven and State of Connecticut, have invented a new and useful Device for Indicating the Speed of Cars, Vehicles, and other Moving Bodies while in Motion; and we do hereby declare the following, when taken in connection with the accompanying drawings and the figures of reference marked thereon, to be a full, clear, and exact description of the same, and which drawings constitute part of this specification, and represent, in—

Figure 1, a side elevation of car-wheel, showing position of spur-gears; Fig. 2, a side elevation of air-pump with both cylinders broken to show the relative positions of the pistons; Fig. 3, a plan view of the air-pump and crank-shaft; Fig. 3$^a$, an elevation of valve 17; Fig. 4, a front elevation of indicating device with glass plate removed and the pointer-cylinder 19 shown in section; Fig. 5, a plan view of device with section on E F of Fig. 4; Fig. 6, a side elevation of device with sections on A B and C D of Fig. 4; Fig. 7, an enlarged elevation of spools and shaft, one spool being in section.

Our invention relates to that class of speed-indicators which operate by air-pressure and indicate the speed at which the car, vehicle, or other body to which it may be attached is moving, and also the maximum speed at which the same has been run during any given period.

In the following specification we will confine ourselves to the description of the device as applied to surface cars, its *modus operandi* being the same in all of its uses, except when employed upon shipboard to indicate the velocity of the ship, in which case the pump is driven by the flexible shafting being attached to the log.

The legal requirements in regard to the maximum speed of surface cars in cities has created a want for a simple device that can be produced at a low cost of manufacture and will at once show to the motorneer or to any one interested the exact speed at which the car is moving, in order that the speed of the car can be increased or decreased, as required, as well as to register the maximum speed that the car has attained during any one trip or during a series of trips.

It will be readily seen that a device of this nature will put at rest all doubt or dispute that may arise as to the speed of a car at a certain time, and thereby prevent any unintentional violation of the law, as well as to give the proper authorities sufficient evidence in case of violations.

We attain these objects by means of the following mechanism:

One of the car-wheels 1 in Fig. 1 is shown standing upon the track 2. To the car-axle 3, which is in transverse section, is attached a spur-gear 4, which meshes into spur-gear 5 on the auxiliary shaft 6. The auxiliary shaft 6 is held in position by a brace 7, which projects from any convenient place upon the bottom of the car. The cylinders 8 8 and the crank-shaft 9, supported upon the stands 10 10, may be located in any position in reference to the auxiliary shaft 6, but preferably upon the bottom of the car.

In connecting the auxiliary shaft 6 with the crank-shaft 9 any of the flexible shafts common to the art may be used, the one shown in Figs. 1, 2, and 3 being common upon dental engines.

The air-pump is constructed of two cylinders 8 8, having a tube or air-passage 11 11, leading from the termination of each cylinder to a central tube 12, which in turn leads to the indicating device proper. Pistons 13 13 are made hollow, upon the inside of which cross-pins 14 14 are provided, making a connection for the piston-rod and allowing of its free movement thereon. Clack-valve 15 is suspended from the head of the piston by a common hinge-joint and is limited in its outward movement by a stop 16, extending from the piston. As the pistons 13 13 are carried backward and forward in the cylinders 8 8 by the rotation of the crank-shaft 9 the valves 15 15 are opened and closed alternately by the action of the air upon them, thus allowing air to fill the cylinders on the forward stroke while valve 15 is open and upon the backward stroke when valve 15 is closed, forcing the air into the tubes 11 11 and from these leading into tube 12.

It will be seen that by having two pistons operating in the manner described there will be a continuous current of air forced into the tube 12, excepting upon the instant when the cranks are upon a dead-center.

To guide the air-current into the tube 12 and to prevent it from going into the other cylinder-tube 11, a hinged valve 17 is provided, which covers the mouth of the tube 11 leading from the cylinder 8 in which the piston is going forward.

The pressure of the air from the cylinder in which the piston is going backward and the suction caused by the piston going forward in the other cylinder causes the hinged valve 17 to operate, alternately closing and opening each of the tubes 11.

In Fig. 3 the valve 17 is shown in a neutral position.

The indicating device proper, as shown in Figs. 4, 5, and 6, is inclosed in a case 18, made, preferably, of a casting and fastened in any convenient place in the car.

The tube 12 is extended from the air-pump into the lower part of the case 18 and joined to the lower part of the pointer-cylinder 19. Pointer-cylinder 19 reaches from the bottom to the top of the case 18, and in the side of the cylinder opposite to the front of the case is a slot 20, the width of which is determined by the amount of air necessary to escape over that requisite to give the required pressure.

A little to the rear of the pointer-cylinder 19 is the graduated plate 21, made of some light sheet metal, with graduations to indicate the speed in miles to the hour.

Pointers 22, which are united to the cup 23 by a strip of metal 26, extending through the slot 20 of the pointer-cylinder 19, have upon their rear faces two fingers 40, which project through slots 24 in the graduated plate 21.

Maximum pointer 25 has upon its rear face a guide-box 41, projecting through the graduated plate 21 and surrounding the rack 27, in which is the spring catch or ratchet 28, adapted to coöperate with the teeth in the rack 27 and hold the pointer 25 in the required position.

A bell to warn the motorneer or person in charge when the car attains a required speed is connected with the indicating device by the insulated wire 28, which is made integral with the copper strips 29. Insulated wire 30 is connected with a battery and made integral with the copper strips 29 29, or if it is upon an electric car then it may derive its current from the source that propels the car. Spools 31 31 upon the shaft 32, which is supported by the bearings 33, made integral with the case 18, are devised to raise or lower the copper strips 29 29, so as to change the point of contact with the pointer-fingers 40, thus making the ringing of the warning-bell variable, according to the speed required. Around the outside diameter of the spools 31 31 is a loose sheet-metal shell 34 with a longitudinal slot 35 in its lower side, through which the copper strip 29 passes.

Copper strips 29 29 are supported in their vertical position by the ways 36 36, which are insulated, as well as the spools 31 31, by any of the common methods known to the art to prevent any contact which would prematurely complete the circuit. The ends of shaft 32 are squared, as at 37, so that a key may be adjusted thereon to rotate said shaft, thus raising or lowering the copper strips 29 in the vertical ways 36 36. To allow of the introduction of the key which operates the shaft 32, a circular hole 38 is made in the side of the case 18. The front of the case 18 is provided with a glass plate 39 to make the graduated plate 21 visible and to prevent dirt or foreign matter from clogging the working parts.

The operation of our device is as follows: By the rotation of the car-axle the air-pump is operated, which forces air through tube 12 into the pointer-cylinder 19, and the air-pressure thus caused forces the cup 23 and pointers 22 upward, indicating upon the graduated plate 21 the speed at which the car is moving. Spring 42, which is attached to the bottom of the cup 23, is inserted to aid the cup in its downward movement. Slot 20 in the rear of the pointer-cylinder 19 is of a width sufficient to allow the escape of all air above that which is necessary to maintain the pointers 22 in the proper position relative to the speed in which the car is moving. The car moving at a rate of ten miles an hour will cause a greater pressure in the pointer-cylinder 19, through the more rapid working of the air-pump, than if the car were moving at the rate of one mile an hour, and hence would raise the cup 23 in the cylinder to a greater height as a result of this greater pressure, and as the graduations on the plate 21 are based on this variation in pressure the pointers indicate the exact speed at which the car is moving. When the car has reached the maximum rate desired, the pointer-fingers 40 come in contact with the copper strips 29 29, which have been previously adjusted, and close the circuit between the battery and the bell and cause the latter to ring until the speed is reduced and the circuit opened. The pointers 22 upon rising come in contact with pointers 25 and raise them with themselves until they reach the highest point, when the pointers 25, through the operation of the ratchet 28 and the rack 27, remain stationary, recording the maximum speed attained, while the pointers 22 may drop again to any given point.

It is obvious that there are many minor changes that can be made within our invention, and we would therefore have it understood that we do not limit ourselves to the exact construction herein shown and described, but hold ourselves at liberty to make such changes and alterations as fall fairly within the spirit and scope of our invention.

We are aware that it is old to operate speed-indicating mechanisms by means of flexible shafting operated indirectly from the car-axle by means of eccentrics, cams, and worm-gears, and we do not, therefore, claim our construction broadly; but What we do claim as new, and desire to secure by Letters Patent, is—

1. In a pneumatic speed-indicator for cars or vehicles, a double-cylinder air-pump, the crank of which derives its motion through flexible shafting connecting an auxiliary shaft with said crank, and said auxiliary shaft being rotated by the coöperation of a spur-gear upon said shaft with a spur-gear upon the axle of the car or vehicle, in combination with the indicating device substantially as described.

2. In a pneumatic speed-indicator for cars or vehicles, an indicating device having a central pointer-cylinder provided through its outer shell with an orifice or outlet for the surplus air-pressure to escape, in combination with a pointer operated by air-pressure upon a piston inside said cylinder and made integral with said piston by a bar or link extending through the orifice or outlet in the pointer-cylinder aforesaid substantially as and for the purposes set forth.

3. In a pneumatic speed-indicator for cars or vehicles, an indicating device having a central pointer-cylinder in combination with two pointers, the lower pointer being operated in one direction from the interior of said cylinder by air-pressure and in the other direction by the contraction of a spring located within the bore of said cylinder, the upper pointer being raised by contact with the lower pointer and held in this extreme position by the coöperation of a ratchet located thereon and a rack secured to the indicator-case substantially as described.

4. In a pneumatic speed-indicator for cars or vehicles a central pointer-cylinder, two pointers, the lower one having upon its rear face and extending laterally therefrom two contact-fingers, in combination with means for ringing an electric alarm-bell at any desired point between the extreme positions of the pointers aforesaid, by the use of two copper strips, one of which is connected with an electric battery and the other with the bell, the circuit being closed by the meeting of the contact-fingers on the lower pointer with the two copper strips substantially as described.

5. In a pneumatic speed-indicator for cars or vehicles the combination of a central pointer-cylinder, of two pointers, of means for ringing an electric alarm-bell by a contact of one of the pointers aforesaid with two copper strips of means for adjusting said copper strips vertically in insulated ways made integral with the indicator-case by the rotation of a shaft upon which are two insulated winding-spools around which said copper strips are coiled substantially as described.

6. In a pneumatic speed-indicator for cars or vehicles an air-pump operated from the axle of the car or vehicle, a tube connecting said air-pump with the indicating device, an indicating device comprising a central pointer-cylinder 19, two pointers 25 40, graduated plate 21, pointer-rack 27, insulated ways 36, copper strips 29 29, means for adjusting said strips vertically by the shaft 32 supported in the bearings 33, spools 31 31; all substantially as and for the purposes as herein set forth.

7. In a double-cylinder air-pump for pneumatic speed-indicators the combination of the cylinders 8 8, tube 11 11, central tube 12, hinged valve 17 suspended therein, pistons 13 13 with clack-valves 15 15 at one end thereof, piston-rods connecting said pistons 13 13 with the crank 9, all substantially as and for the purposes as herein set forth.

JAMES M. KANE.
JAMES H. MacLAUCHLAN.

Witnesses:
RICHARD H. TYNER,
WM. O'KEEFE, Jr.